United States Patent [19]

Suzuki et al.

[11] Patent Number: 4,616,411
[45] Date of Patent: Oct. 14, 1986

[54] APPARATUS FOR FASTENING A DOOR TO A VEHICLE

[75] Inventors: Toshifumi Suzuki, Hidaka; Toshio Kawano, Sakado; Ryoichi Setoguchi, Sayama; Toshio Ishida, Kawagoe; Seiiti Mikami, Tokorozawa, all of Japan

[73] Assignee: Honda Giken Kogyo Kabushiki Kaisha, Tokyo, Japan

[21] Appl. No.: 734,728

[22] Filed: May 16, 1985

[30] Foreign Application Priority Data

May 16, 1984 [JP] Japan ............................ 59-70406[U]

[51] Int. Cl.⁴ ............................................. B23P 19/00
[52] U.S. Cl. ..................................................... 29/822
[58] Field of Search ................. 81/57.22, 57.36, 57.37, 81/435; 29/822

[56] References Cited

U.S. PATENT DOCUMENTS

| 2,742,807 | 4/1956 | Ferm et al. | 81/57.36 |
| 2,807,972 | 10/1957 | Mitchell | 81/57.36 |
| 3,156,142 | 11/1964 | Finkle | 81/57.37 |
| 3,279,045 | 10/1966 | Dixon | 29/822 |
| 3,979,817 | 9/1976 | Cheak | 81/57.22 |
| 4,003,417 | 1/1977 | Cornwell | 81/57.37 |

Primary Examiner—Howard N. Goldberg
Assistant Examiner—Steven Nichols
Attorney, Agent, or Firm—Armstrong, Nikaido, Marmelstein & Kubovcik

[57] ABSTRACT

An improvement in a door fastening apparatus wherein a bolt receiving and supply device is provided alongside of a fastening head unit. It includes a bolt supplying head connected to a parts feeder and a laterally movable transferring head receiving bolts from the supply head and moving over to in front of the nut runner to deliver the bolts. The supply head can be fed through a bolt pressure feeding tube. The transferring head has a clamping cylinder therein for clamping the bolt in the receiving opening.

3 Claims, 8 Drawing Figures

APPARATUS FOR FASTENING A DOOR TO A VEHICLE

BACKGROUND OF THE INVENTION

This invention relates to an apparatus for fastening a door onto a vehicle where the door hinge of the door inserted in a door opening portion of the vehicle body is bolted to the vehicle body by a nut runner provided on a fastening head arranged to be movable to advance and retreat in relation to a vehicle body.

Usually such a fastening apparatus has an opening and closing jaw means on a forward end portion of a fastening head for holding a bolt supplied from a parts feeder so that, by advancing a nut runner through the interior of the jaw means, the bolt may be brought into engagement with the nut runner and thereby a door hinge can be bolted.

This type of apparatus, however, has the inconvenience that the fastening head is relatively large in diameter at its forward end portion due to the jaw means. Consequently, it is necessary that a comparatively large width clearance for allowing the jaw means to pass therethrough is required between an end edge of the door and a portion to which the door hinge is to be bolted. Thus, the degree of freedom in designing of a vehicle body is restricted.

OBJECTS AND SUMMARY OF THE INVENTION

This invention has for its object to provide a fastening apparatus which is free from the foregoing inconvenience of a relatively large diameter forward end portion of the fastening head. The invention enables a bolt to be set on a nut runner through a bolt receiving and supplying means provided separately from the nut runner, while the use of the jaw means is abolished. This results in it being possible to use the invention in the case of a vehicle design wherein the clearance between an end edge of a door and a portion to which a door hinge is to be bolted is set to be a comparatively narrow one.

This invention is used in an apparatus wherein a door hinge of a door inserted in a door opening portion of a vehicle body is bolted to the vehicle body by a nut runner provided on a fastening head arranged to be movable to advance and retreat in relation to a vehicle body side. The invention is characterized in that a bolt receiving and supplying means comprising a bolt supply head connected to a parts feeder and a bolt transferring head is provided on a side of the fastening head. The transferring head is arranged to be movable between a bolt receiving position facing the supplying head and a bolt delivering position facing the fastening head so that a bolt supplied through the supplying head may be set on the nut runner through the transferring head.

BRIEF DESCRIPTION OF THE DRAWINGS

The above and other objects and the attendant advantages of the present invention will become readily apparent by reference to the following detailed description in consideration in conjunction with the accompanying drawings wherein.

DETAILED DESCRIPTION OF THE PREFERRED EMBODIMENT

Figure 1:
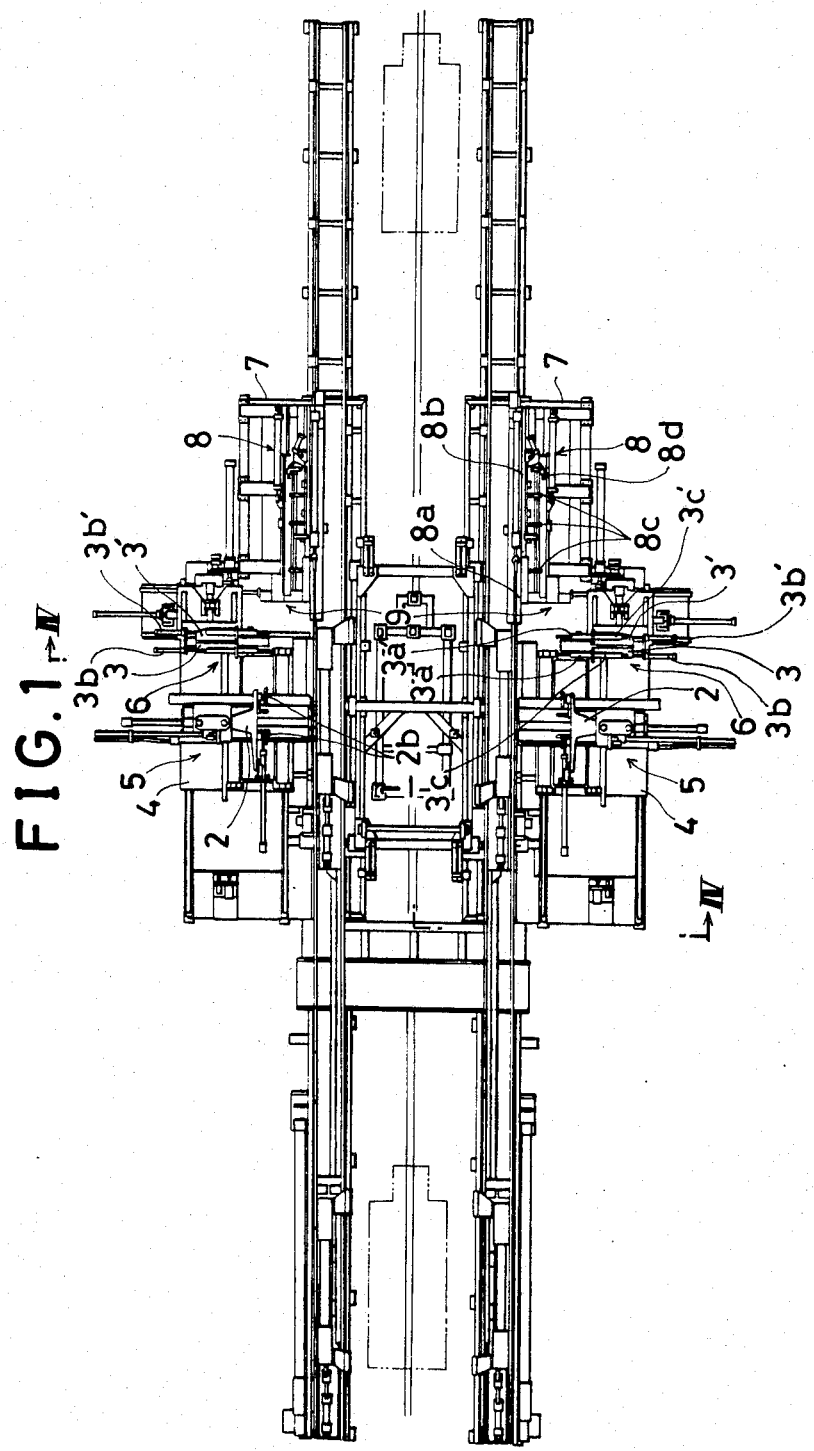
FIG. 1 is a top plan view of a vehicle door assembling apparatus provided with this invention.
Figure 2:
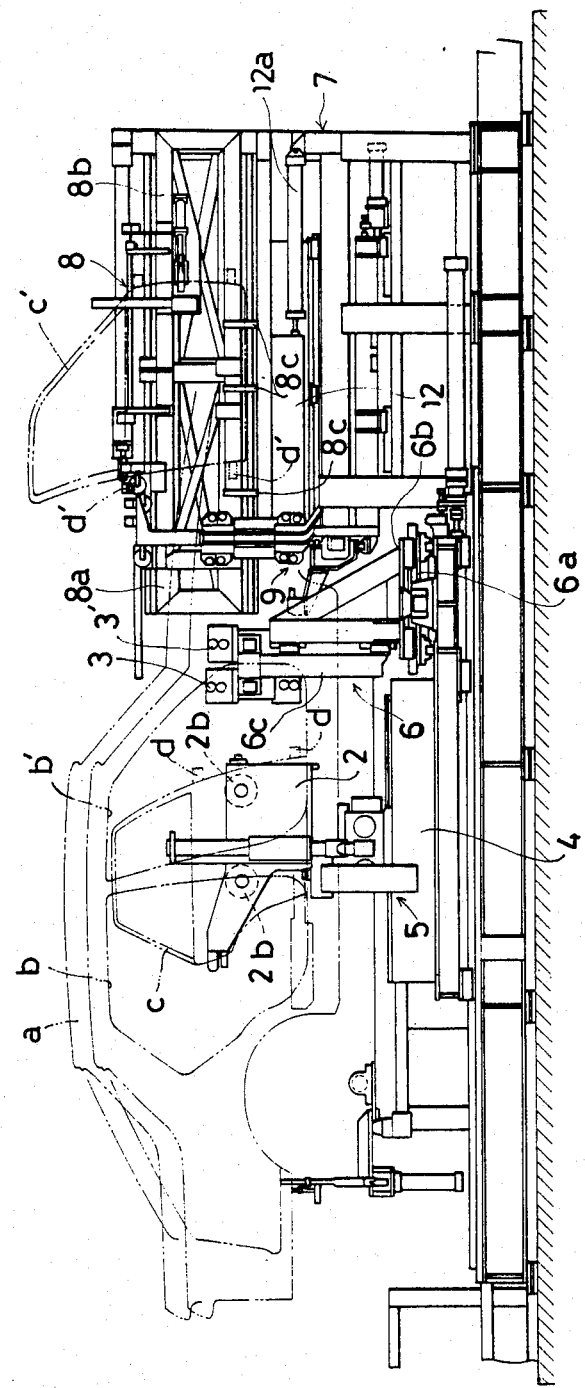
FIG. 2 is a enlarged side view of an important portion thereof for showing a detailed construction thereof.
Figure 3:
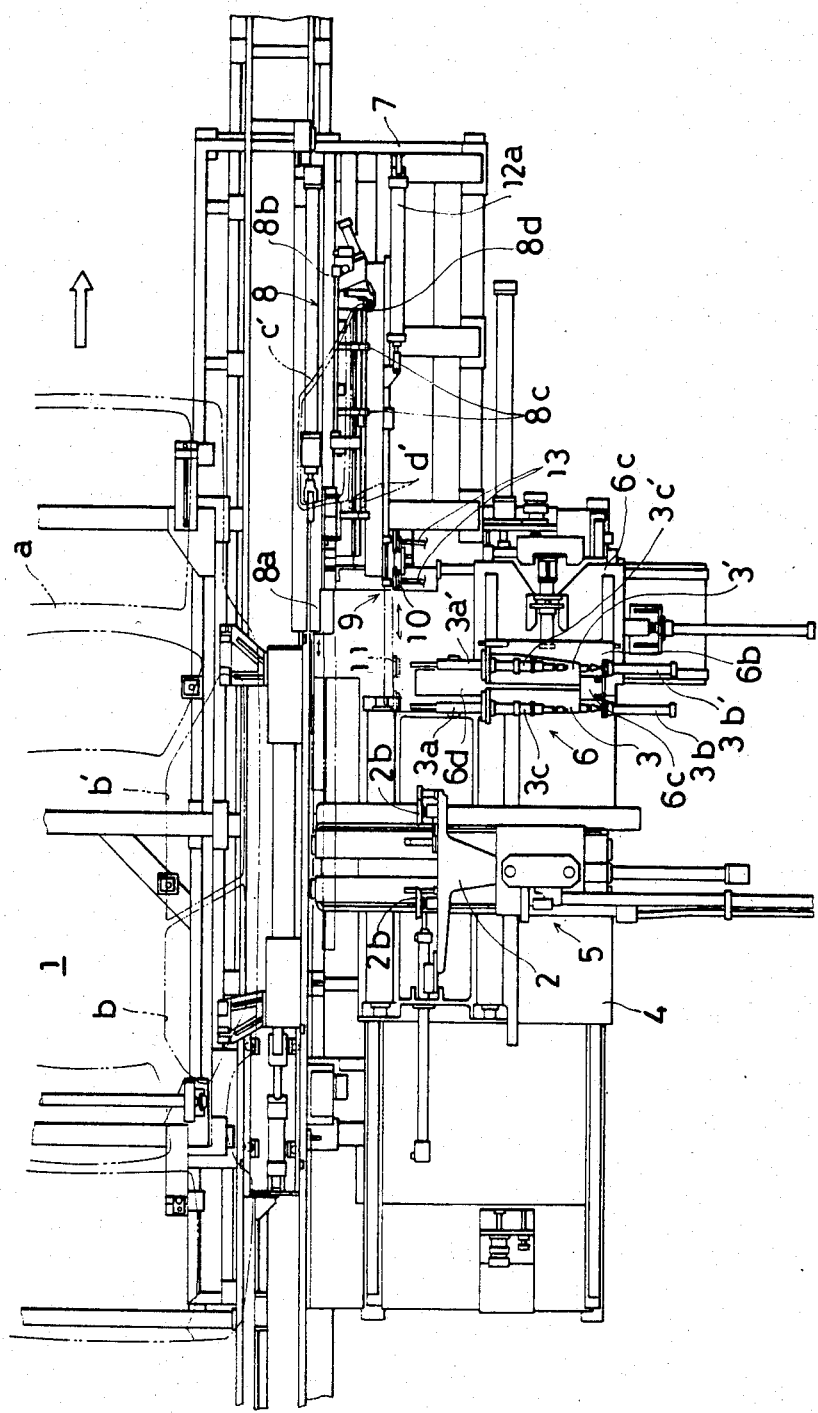
FIG. 3 is a top plan view thereof.
Figure 4:
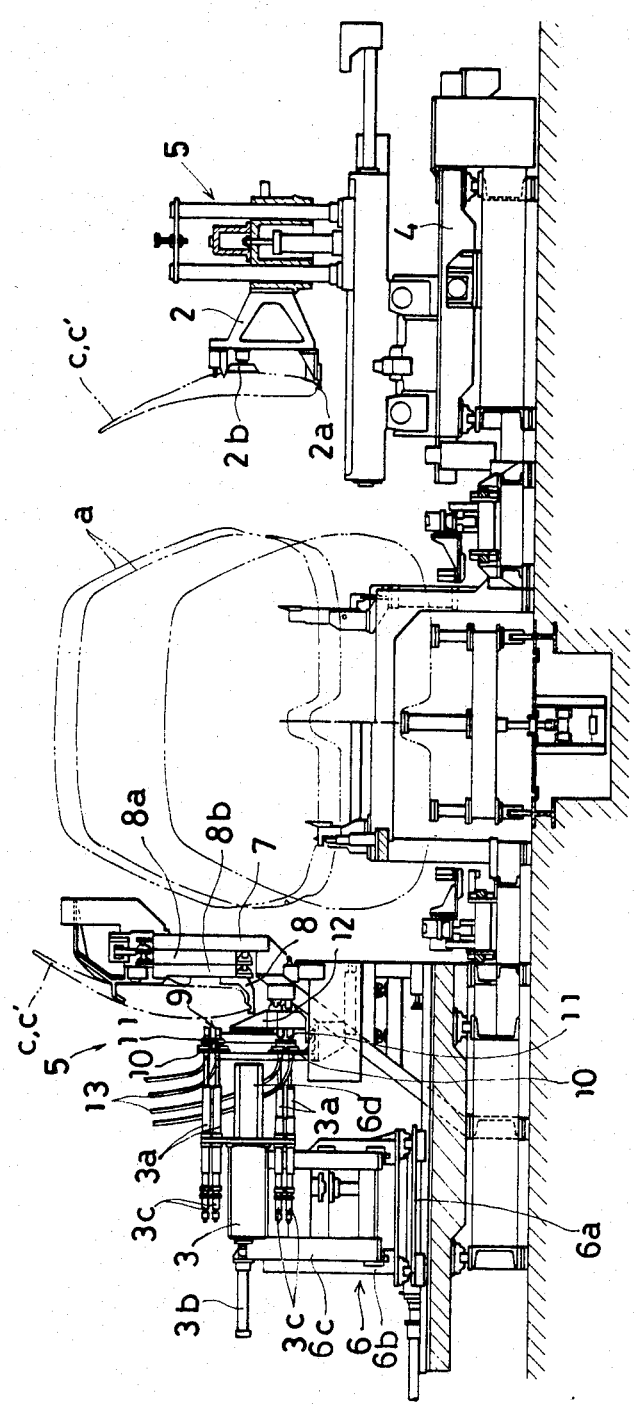
FIG. 4 is a sectional view taken along the line IV—IV in FIG. 1.

One embodiment of this invention will be explained with reference to the accompanying drawings:

Referring to FIGS. 1–4, an assembling station 1 is provided in the middle of a conveying line for a vehicle body a. A set jig 2 is provided on each side portion of the station 1 so that a rear door opening portion b and a front door opening portion b' of the vehicle body a set on the station 1 may be assembled with a rear door c and a front door c', in order, through the set jig 2.

Additionally, a pair of fastening heads 3, 3' for the rear door c and the front door c' are disposed in front and rear relationship on a front side of each set jig 2 in the longitudinal direction of the conveying line, so that these doors c, c' may be bolted at their door hinges d, d' to respective portions of the vehicle body a by means of a plural nut runners 3a, 3a' provided on the respective fastening heads 3, 3'.

More in detail, each set jig 2 is supported on a shift table 4 which is shiftable in the vehicle length direction and is movable in three directions, that is, in the vehicle length direction, in the vehicle width direction and in the vehicle height direction, by a first three dimensional right-angled coordinates type robot mechanism 5, operated by a control means (not shown). Additionally, the two fastening heads 3, 3' are able, through a second three dimensional right-angled coordinates type robot mechanism 6 on the shift table 4 located at a front position of the set jig 2, to be driven to be moved inwardly, that is, in the vehicle width direction, by respective feeding cylinders 3b, 3b'.

Additionally, a machine frame 7 located in front of the shift table 4 has a door introducing means 8 comprising a pair of inner and outer slide frames 8a, 8b having a booster mechanism so that the following operation can be performed. Namely, by operating the introducing means 8, the rear door c which is held by the outer slide frame 8b thereof ready to be set in position by a door receiver 8c and a clamp member 8d which are provided on the slide fram 8b is conveyed to a predetermined door introducing position facing the set jig 2 located at its door receiving position as illustrated. The rear door c is held by the set jig 2 so as to be set in position while received and attracted respectively by a door receiver 2a and a vacuum pad 2b which are provided on the set jig 2. Thereafter, by a rearward movement of the shift table 4 and an operation of the robot mechanism 5, the set jig 2 is moved to be set in position at its position corresponding to the rear door opening portion b. Thereafter, the set jig 2 is advanced inwardly, that is, in the vehicle width direction so that the rear door c may be inserted into the rear door opening portion b. Under this condition, the fastening head 3 for the rear door c which is previously set in position by the robot mechanism 6, at its position corresponding to a portion to which the door hinge d is to be bolted, is driven forward by the feeding cylinder 3b. The door hinge d is then bolted to a center pillar portion of the vehicle body a, as clearly shown in FIG. 8, by the nut runner 3a provided on the fastening head 3.

Next, in almost the same manner as above, the front door c' introduced by the introducing means 8 is inserted into the front door opening portion b' through the set jig 2, and the door hinge d' of the front door c' is bolted to a front pillar portion of the vehicle body a by the nut runner 3a' provided on the fastening head 3' for the front door c'.

Referring to the drawings, air driven units 3c, 3c' for the nut runners 3a, 3a' are provided on the respective fastening head 3, 3', and magnets 3d, 3d' for bolt attraction are provided in socket portions of the forward ends of the respective nut runners 3a, 3a'.

The foregoing robot mechanism 6 comprises a first slide frame 6a movable to advance and retreat in the vehicle width direction, a second slide frame 6b provided on the frame 6a so as to be movable to advance and retreat in the vehicle length direction, and an elevating frame 6c provided on the second slide frame 6b so as to be movable upwards and downwards in the vehicle height direction. Each of the fastening heads 3, 3' is supported on a guide frame 6d which is provided on the elevating frame 6c and can extend longitudinally in the vehicle width direction.

Figure 8:
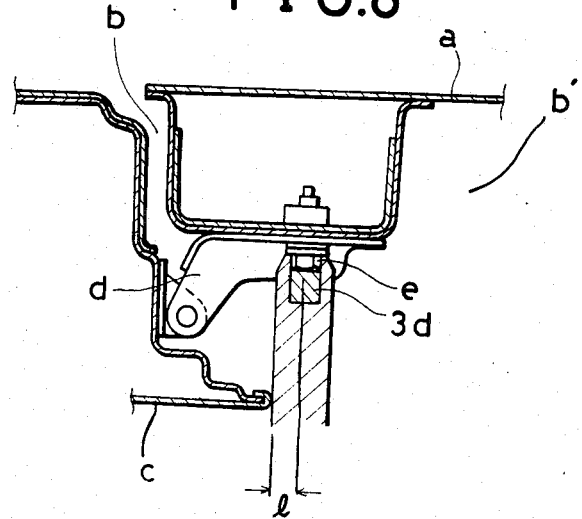
FIG. 8 is a sectional top plan view of a bolting portion of a rear door.

If the respective fastening heads 3, 3' are provided on their forward end portions with jaw means for being inserted with the respective nut runners so that bolts may be supplied thereto directly from a parts feeder, it would often happen that the jaw means becomes a hindrance especially when an interval between the front end edge of the rear door c and the portion to which the door hinge d is to be bolted is narrowed, as shown in FIG. 8, in view of the relation of the rear door c with the width of the center pillar or the like. Consequently, the desired bolting cannot be carried out.

Accordingly, in the illustrated embodiment, according to the characteristic features of this invention, a bolt receiving and supplying means 9 is provided on the machine frame 7 located in front of the fastening heads 3, 3' so that bolts supplied from a parts feeder (not illustrated) may be set on the respective nut runners 3a, 3a' through the foregoing means 9. Then the desired bolting may be carried out reliably, without using the jaw means, even when the foregoing clearance 1 is narrowed to that corresponding to the radius of the nut runner 3a itself.

Figure 5:
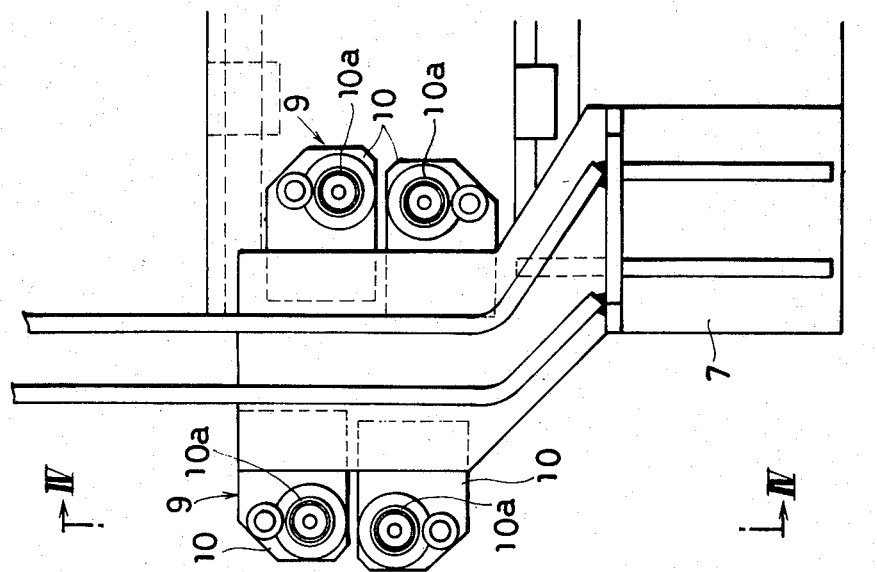
FIG. 5 is an enlarged front view of an important portion of a bolt receiving and supplying means thereof.
Figure 6:
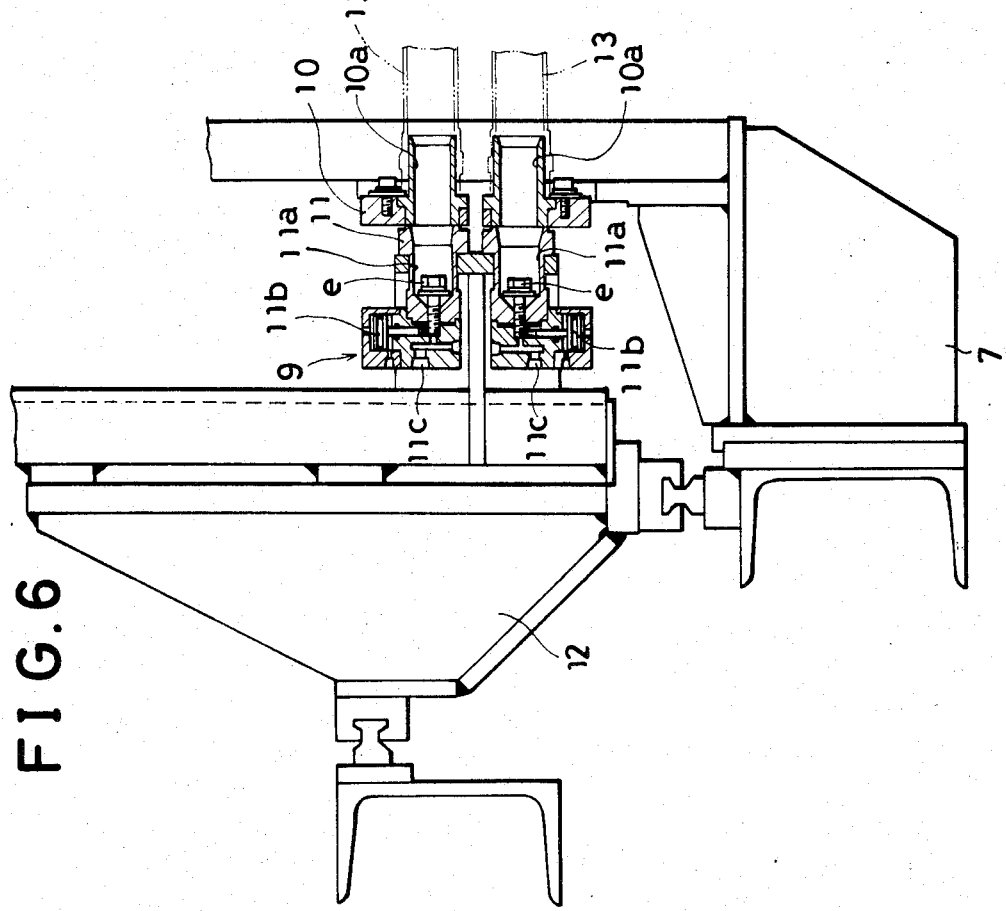
FIG. 6 is a sectional view taken along the line VI—VI in FIG. 5.
Figure 7:
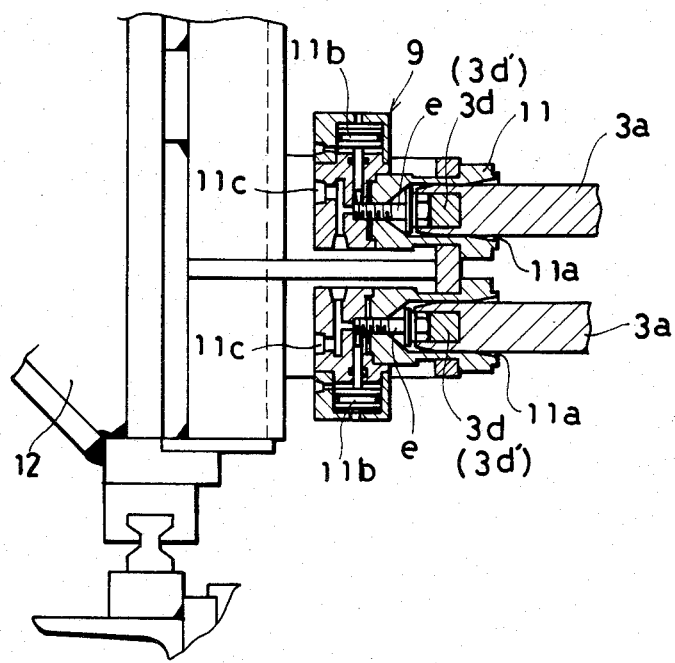
FIG. 7 is a sectional side view of an important portion thereof for explaining a bolt setting of a nut runner thereof.

The bolt receiving and supplying means 9 comprises a bolt supplying head 10 which is to be connected to a parts feeder and a bolt transferring head 11. The supplying head 10 is fixedly provided on the machine frame 7. The transferring head 11 is attached to a slide frame 12 provided on the machine frame 7 so that, by an operation of a driving cylinder 12a for the slide frame 12, the transferring head 11 may be moved reciprocally between its frontward bolt receiving position facing the supplying head 10 and its rearward delivering position facing the foregoing fastening head 3, 3'. Additionally, as shown in FIGS. 5 and 6, the supplying head 10 is provided with a plurality of bolt supplying openings 10a for being connected to bolt pressure feeding tubes 13 connected to a parts feeder. The bolt supplying openings 10a, 10a may be disposed in accordance with the disposition of the nut runners 3a, 3a of the respective fastening head 3, 3'. The transferring head 11 is also provided, in the similar manner as above, with a plurality of bolt receiving openings 11a for receiving bolts supplied through the supplying openings 10a. In addition, each receiving opening 11a is provided with a clamp cylinder 11b for firmly holding the bolt inserted therein, and an air introducing opening 11c for both cleaning the bolt receiving opening 11a and pushing-out the bolt.

Next, the operation of the foregoing example will be explained as follows:

Prior to introducing the rear door c to the set jig 2, a bolt e is set, through the bolt receiving and supplying means 9, to each of the nut runners 3a, 3a' of the two fastening heads 3, 3' for the rear door and the front door, respectively.

More in detail, each bolt receiving opening 11a of the bolt transferring head 11 is supplied, through each bolt supplying opening 10a of the bolt supplying head 10, with a bolt e charged from the parts feeder. Then the transferring head 11 is moved to the bolt delivering position with each bolt e fixed in the corresponding receiving opening 11a by the operation of each clamp cylinder 11b. Then the two fastening heads 3, 3' are slightly advanced towards the transferring head 11 and each of the nut runners 3a, 3a' is inserted in each receiving opening 11a while being rotated, whereby the head of each bolt e is brought into engagement with the forward end socket portion thereof. After the engagement thereof, each clamp cylinder 11b is released from its holding operation. At the same time, the two fastening heads 3, 3' are retreated, whereby each bolt e is drawn out from each receiving opening 11a under the condition that the same is attracted by each magnet 3d, 3d' provided on each nut runner 3a, 3a'. Thereafter, the respective fastening heads 3, 3' are operated as mentioned above so as to effect the bolting of the door hinge d of the rear door c and the bolting of the door hinge d' of the front door c'.

Alternatively, instead of assembling the rear door and the front door by the single common set jig 2 as in the foregoing example with the vehicle body, the rear door and the front door are intended to be assembled by their individual set jigs mounted on individual robot mechanisms, then the fastening head for the rear door and the fastening head for the front door are mounted, individually one from another, on individual robot mechanisms provided in parallel with the foregoing robot mechanisms. In this case, the bolt receiving and supplying means 9 for the rear door and that for the front door are provided separately one from another.

Thus, according to this invention, the bolt receiving and supplying means is provided on one side of the fastening means so that a bolt supplied from a parts feeder may be set on the nut runner provided on the fastening head by way of the bolt transferring head provided on the bolt receiving and supplying means. Thus, it is not required that the fastening head is provided with a jaw means for holding a bolt supplied from a parts feeder. The bolting can be carried out reliably even if the interval between an end edge of a door and a portion to which a door hinge is to be bolted is narrow, so far as there exists the interval for allowing the nut runner to pass therethrough. Thus, a degree of freedom in a vehicle design can be increased.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. An apparatus for fastening a door to a vehicle wherein a door hinge of a door inserted in a door opening portion of a vehicle body is bolted to the vehicle body comprising:
    a machine frame;
    a fastening head movably mounted on the frame;
    means for moving the fastening head towards and away from the vehicle body;
    a nut runner on the fastening head having a non-gripping means for holding a bolt in a socket on a forward end thereof; and
    bolt receiving and supply means on the frame for receiving bolts from a parts feeder and supplying the bolts to the nut runner, said bolt receiving and supply means including:
    a bolt supplying head connected to the parts feeder and stationarily positioned to one side of said fastening head relative to the vehicle body,
    a bolt transferring head movable between a bolt receiving position facing said supplying head and a bolt delivering position facing said nut runner and having means for holding a bolt, and
    means for moving said bolt transferring head between said positions so that a bolt supplied through said supplying head is transferred therefrom by said transferring head to said nut runner.

2. An apparatus as claimed in claim 1, wherein the supplying head is fixedly provided on said machine frame, and the transferring head is attached to a slide frame movably mounted on the machine frame and the means for moving comprises a driving cylinder on the machine frame.

3. An apparatus as claimed in claim 2, wherein the supplying head is provided with at least one bolt supplying opening connected to the parts feeder through a bolt pressure feeding tube, and the transferring head is provided with at least one bolt receiving opening for receiving a bolt supplied through the supplying opening, and the receiving opening is provided with a clamping cylinder for clamping a bolt inserted in the receiving opening.

* * * * *